(12) United States Patent
Kühnrich et al.

(10) Patent No.: US 8,419,937 B2
(45) Date of Patent: Apr. 16, 2013

(54) FILTER DEVICE AND FILTER ELEMENT

(75) Inventors: Silke Kühnrich, Völklingen (DE);
Werner Wilkendorf, Ottweiler (DE)

(73) Assignee: Hydac Filtertechnik GmbH,
Sulzbach/Saar (DE)

( * ) Notice: Subject to any disclaimer, the term of this patent is extended or adjusted under 35 U.S.C. 154(b) by 0 days.

(21) Appl. No.: 12/998,082

(22) PCT Filed: Aug. 26, 2009

(86) PCT No.: PCT/EP2009/006175
§ 371 (c)(1),
(2), (4) Date: Mar. 16, 2011

(87) PCT Pub. No.: WO2010/031488
PCT Pub. Date: Mar. 25, 2010

(65) Prior Publication Data
US 2011/0168619 A1    Jul. 14, 2011

(30) Foreign Application Priority Data

Sep. 19, 2008  (DE) .......................... 10 2008 048 155

(51) Int. Cl.
*B01D 27/08* (2006.01)
*B01D 35/30* (2006.01)
(52) U.S. Cl.
USPC .......................................... 210/232; 210/450
(58) Field of Classification Search .................. 210/232, 210/450
See application file for complete search history.

(56) References Cited

U.S. PATENT DOCUMENTS

| 4,105,561 | A | * | 8/1978 | Domnick ....................... 210/232 |
| 4,379,053 | A | * | 4/1983 | Brane ........................... 210/234 |
| 5,164,082 | A | * | 11/1992 | Lin ............................... 210/238 |
| 5,342,519 | A | * | 8/1994 | Friedmann et al. ........... 210/232 |
| 5,685,981 | A | * | 11/1997 | Koslow ......................... 210/282 |
| 5,985,143 | A | * | 11/1999 | Lin ............................... 210/232 |
| 7,303,673 | B1 | | 12/2007 | Glazewski |
| 2010/0181243 | A1 | * | 7/2010 | Dworatzek et al. ........... 210/232 |

FOREIGN PATENT DOCUMENTS

| DE | 25 06 359 A1 | 10/1975 |
| DE | 88 04 930 U1 | 7/1988 |
| DE | 20 2006 011 990 U1 | 1/2008 |
| FR | 2 380 058 A1 | 9/1978 |
| WO | WO 2005/123216 A1 | 12/2005 |
| WO | WO 2008015088 A1 * | 2/2008 |

* cited by examiner

*Primary Examiner* — Thomas M Lithgow
(74) *Attorney, Agent, or Firm* — Roylance, Abrams, Berdo & Goodman L.L.P.

(57) ABSTRACT

A filter device has a cup-shaped filter housing (1), a filter element (13) in the housing and at least one end cap (21). A retaining device detachably fixes the filter element (13) along its longitudinal axis and has screwing elements (33, 41) interacting with each other and configured on the interior of the filter housing (1) and on the filter element (13). A sealing device (38) forms the seal between the filter element (13) and a housing terminating part (5) limiting the filter housing (1) at an end. The housing terminating part (5) forms an element receiving device having a fluid passage (43) concentric to the longitudinal axis (3). The fluid passage has inner screwing elements (41). A connecting piece (31) of the end cap (21) is able to be screwed into the passage using outer screwing elements (33). The sealing device has a sealing element (38) that is combined with the end cap (21) to form a cohesive component and that is accommodated in a seat (37) configured at the transition between the end cap (21) and the adjacent beginning of the thread turns (39) of the screwing elements (33) positioned at the connecting piece (31).

4 Claims, 3 Drawing Sheets

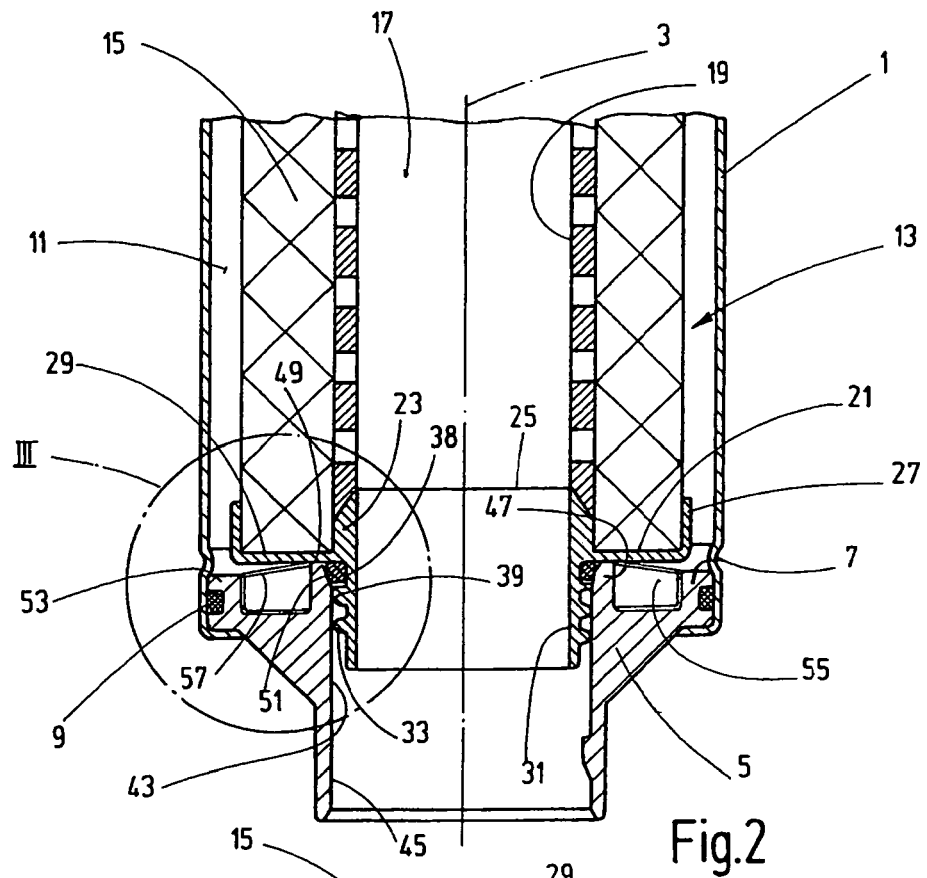
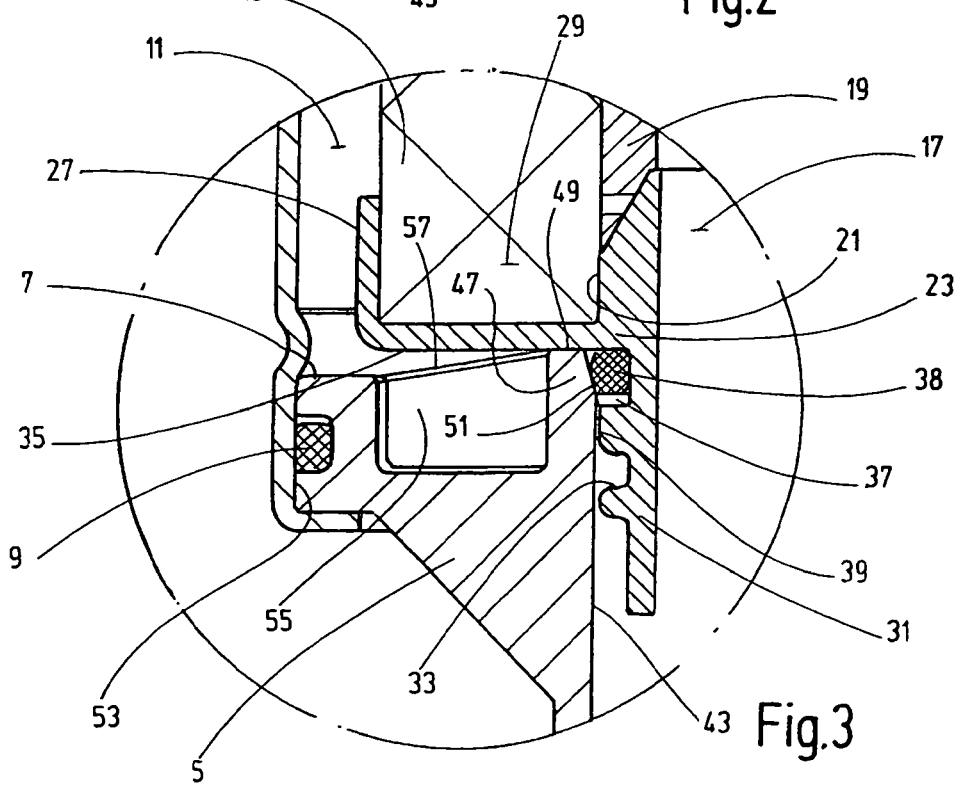

FILTER DEVICE AND FILTER ELEMENT

FIELD OF THE INVENTION

The invention relates to a filter device having a cup-shaped filter housing, with a filter element accommodated therein and with at least one end cap. A retaining device detachable fixes the filter element along its longitudinal axis and has screwing elements interacting with one another configured on the inside of the filter housing and on the filter element. A sealing device forms the seal between the filter element and a housing terminating part bordering the filter housing on the end side. The invention furthermore relates to a filter element intended for the filter device.

BACKGROUND OF THE INVENTION

Filter devices for holding of filter elements are readily available on the market in a plurality of versions. A significant portion of production costs in such filter devices is spent on the construction of the retaining device for detachable fixing of the filter element within the pertinent housing and of the sealing device for sealing the interior of the filter element relative to the filter housing.

In a filter device of this type as shown in document WO 2005/123216 A1, in an effort to keep production costs especially low, the sealing device is designed as a one-piece component of a pertinent end cap of the filter element; i.e., it is produced from the same material as the end cap. This construction makes production cheaper and easier. Conventional separate sealing devices extending between a filter element and a housing terminating part can then be omitted. In addition, mounting processes are simplified because there is no need to focus on handling separate sealing devices. On the other hand, limitations arise with respect to the quality of the seal formed because plastic materials which are conventional and suitable for production of the end caps cannot all be regarded as suitable sealing materials. This situation results in limitations in the choice of materials in the production of the end caps. In addition, for a sealing device molded in one piece on the end cap, a close tolerance is necessary in the production of the end caps to ensure a reliable seal.

SUMMARY OF THE INVENTION

An object of the invention is to provide a filter device having an especially reliable seal between the filter element and the filter housing, while retaining the advantages, specifically the simple handling in installation and low production costs. Another object of the invention is to provide a filter element suitable for this filter device.

These objects are basically achieved by a filter device and a filter element where the housing terminating part, on which the seal can be formed relative to the filter element, is designed as a receiving device of the filter element with a fluid passage provided with inner screwing elements and concentric to the longitudinal axis of the filter element. A connecting piece of the end cap can be screwed into the fluid passage of the housing terminating part with external screwing elements. The sealing device has a sealing element accommodated at the same time on the end cap in a seat such that it is combined with the end cap to form a cohesive component. The seat of the sealing element is located at the transition between the end cap and the adjacent start of the thread turns of the screwing elements located on the connecting piece of the end cap.

In this positioning of the sealing element, the tightening of the screw union, i.e., the screwing of the connecting piece of the end cap into the fluid passage of the housing terminating part, leads to adhesion between the end cap, the sealing element adjoining it, and the pertinent end of the fluid passage in the housing terminating part. The retaining force of the screwing elements at the same time then produces the sealing force acting on the sealing element. Since the sealing element with the end cap forms a cohesive component, the mounting process at the same time is made simple and reliable. Moreover, there are no limitations at all with respect to the material choice because the end cap can be molded from suitable plastics regardless of whether a pertinent material is suitable as a sealing material or not. Likewise no limitations exist at all with respect to the choice of the material of the sealing element. Rather, a suitable material, for example, an elastomer, especially rubber material, can be chosen at will with respect to the requirements, for example, in the form of an O-ring.

Advantageously, the housing terminating part as the bottom part of the filter housing forms the element receiving device for the end cap of the filter element. The end cap is assigned to the housing bottom. In a filter element through which flow takes place in the conventional manner from its outer side to an inner filter cavity, by way of the connecting piece of the end cap, the cleaned fluid can drain via the fluid passage of the housing bottom down with a flow direction along the longitudinal axis with little flow resistance.

In especially advantageous exemplary embodiments, the fluid passage of the bottom part is bordered by an annular edge projecting into the interior of the housing and forming a contact surface for the end cap adjoining due to the retaining force of the screwing elements. When the screw union is tightened, a defined sealing force then presses the sealing element and is limited by the positive contact of the end cap with the annular edge of the fluid passage.

In an especially advantageous manner, the fluid passage of the bottom part on the end section bordering the annular edge has an oblique surface increasing the inside diameter toward the annular edge and forming a sealing surface for the interaction with the sealing element fixed on the connecting piece of the end cap. In this way, an especially reliable seal is ensured since the sealing element is pressed both axially and radially by the retaining force of the screwing elements.

In advantageous exemplary embodiments, the sealing element can be a gasket, preferably an O-ring, held on the connecting piece in a seat between the flat lower end surface of the end cap extending in a radial plane, and the first thread turn of the screwing elements of the connecting piece.

The thread turns on the connecting piece of the end cap can be formed as a round thread. This structure promotes efficient manufacture of the end cap by molding.

In especially advantageous exemplary embodiments, the bottom part has radial ribs bordering the flat contact surface with the annular edge. The annular edge axial height decreases toward the peripheral zone of the bottom part. This structure yields high structural strength for the bottom part with low material cost. At the same time, a narrow toleration of the dimension of the ribs is not necessary because only the contact surfaces with the annular edge interact with the end cap because the ribs run are sloped.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a partial side elevational view in section of the lower section of the exemplary embodiment shown in FIG. 1;

FIG. 3 is a partial side elevational view in section of the region III of FIG. 2, drawn enlarged compared to FIG. 2;

DETAILED DESCRIPTION OF THE INVENTION

Figure 1:
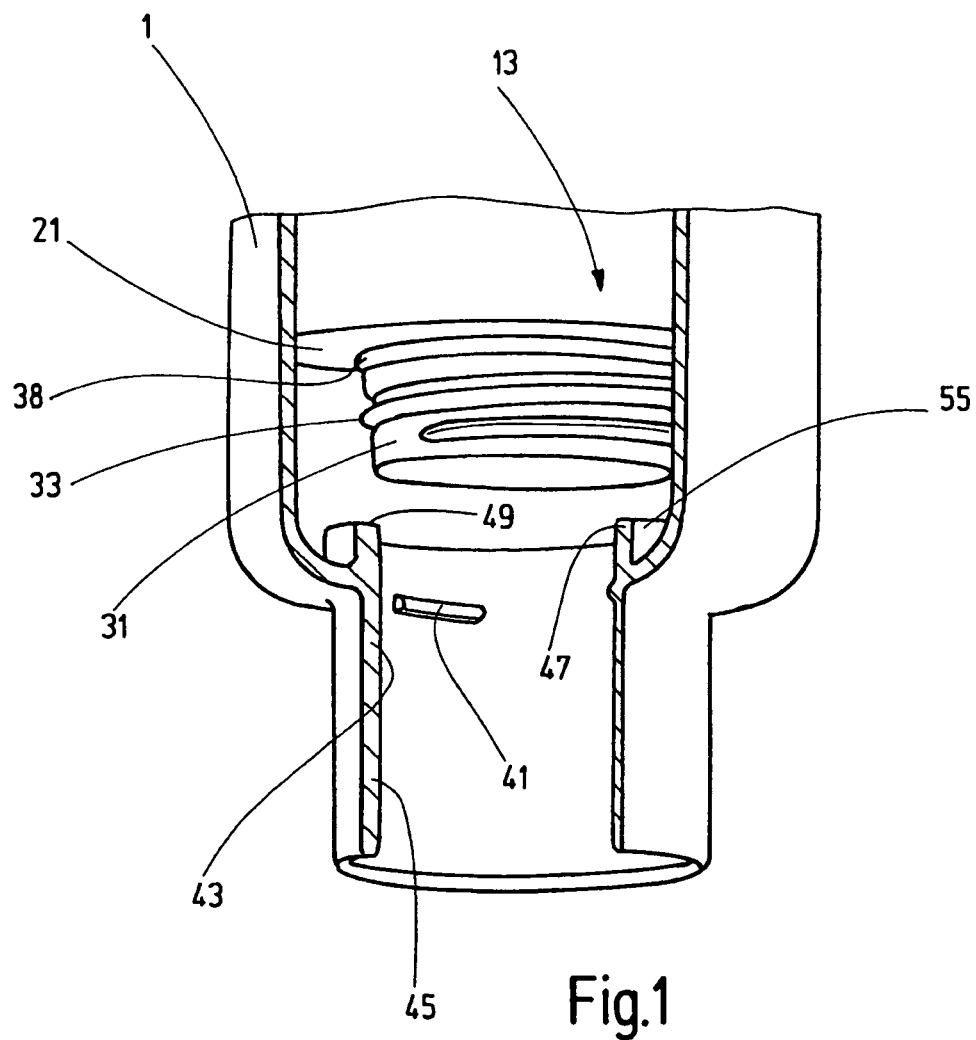
FIG. 1 is a partial, highly schematically simplified perspective view partially in section of only the lower, bottom side end section of a filter device according to one exemplary embodiment of the invention.

A filter housing 1 is in the form of a cup rotationally symmetrical to the longitudinal axis 3 in its outline. FIGS. 1 and 2 show only the lower, bottom side end section where the housing 1 is closed by a bottom part 5. The bottom part 5 can be formed by a metallic injection molded part or a component molded from plastic. On its outer periphery, the bottom part 5 has a flange region 7 connected to the housing wall extending upward. The flange region 7 has a seal 9 inserted in a peripheral annular groove of the bottom part 5. The filter housing 1 can be closed on its upper part (not shown) by a housing cover of conventional design and has a fluid supply (not shown) via which fluid to be cleaned can be supplied to an outer fluid space 11 located on the outer side of a filter element 13 in the form of a filter cartridge. In operation, the fluid to be cleaned flows from the outer space 11 through the filter material 15 of the filter element 13 into an inner filter cavity 17. Inner filter cavity 17 forms the clean side in the filtration process and is located in the interior of a fluid-permeable support pipe 19 surrounded by the filter material 15. On the lower end facing the bottom part 5, the support pipe 19 is connected to an end cap 21 of the filter element 13 forming an enclosure for the facing end edge of the filter material 15. The end cap 21 can be molded out of plastic in one piece with the support pipe 19 or, as shown in FIGS. 2 and 3, can form a separate component joined to the end cap 21.

Figure 4:
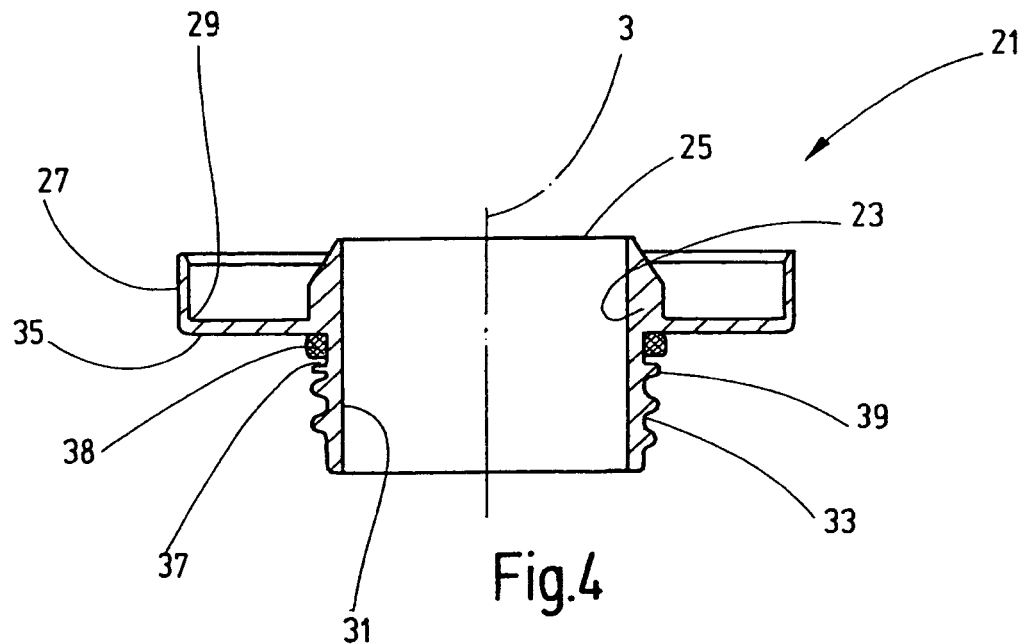
FIG. 4 is a side elevational view in section of only the filter element end cap of FIG. 2.
Figure 5:
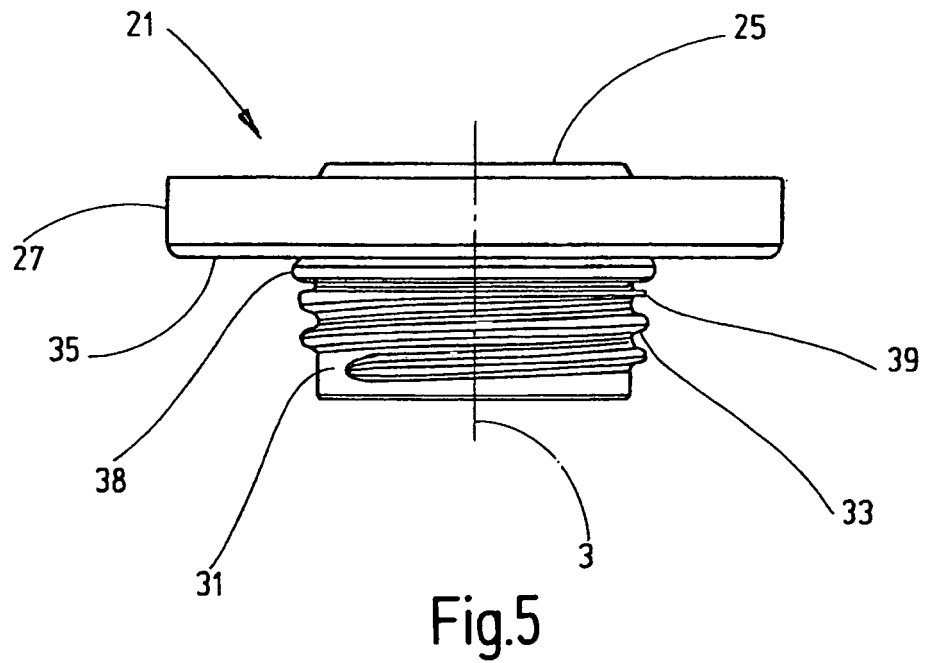
FIG. 5 is a side elevational view of only the filter element end cap of the exemplary embodiment of FIG. 2.

As is apparent from FIGS. 2 and 3, the bottom part 5 forms the housing terminating part. For fixing the filter element 13 within the filter housing 1, bottom part 5 forms an element receiving device that interacts with the pertinent end cap 21, on which device the sealing takes place at the same time between the filter element 13 and the filter housing 1. The configuration of the end cap 21 of the filter element 13 is shown best in FIGS. 3 to 5, of which FIGS. 4 and 5 show the end cap 21 individually. It is a body of revolution with a central hollow body 23 concentric to the axis 3. In the region of its one end 25, the body 23 is surrounded by a radially extending annular body 27 bordering an annulus 29 open toward the side of the end 25 and forming the enclosure for the end of the filter material 15 of the filter element 13. The filter material end is held in the annulus. Proceeding from the annular body 27, the body 23 forms a connecting piece 31 extending in the axial direction. The outer side of connecting piece 31 has screwing elements 33 in the form of an external thread formed as a round thread. Following the flat lower end surface 35 of the annular body 27 facing away from the end 25, on the outer periphery of the connecting piece 31 an annular groove-like seat 37 receives a sealing element in the form of a gasket 38 held and secured between the end surface 35 and the first thread turn 39. The gasket 38 with the end cap 21 then forms a cohesive component. In other words, the end cap 21 and the filter element 13 thereof can contain the sealing element necessary for sealing as a premounted component before the pertinent filter element is put into operation.

As is best shown in FIGS. 4 and 5, the gasket 38 in the unloaded state forms a radial projection above and laterally beyond the screwing elements 33. This configuration results in the seal engagement shown in FIGS. 2 and 3, especially in FIG. 3, with an assigned sealing surface on the bottom part 5, when a retaining force takes effect securing the filter element 13 in the element receiving device formed by the bottom part 5 becoming active by screwing the screwing elements 33 on the connecting piece 31 with assigned screwing elements 41 on the bottom part 5. These screwing elements 41 on the bottom part 5 are formed in an inner concentric fluid passage 43 of the bottom part 5 by sloped ribs projecting radially to the inside, of which only one is shown in FIG. 1. These sloped ribs act as parts of individual sections of thread turns, specifically as parts of a round thread screw union in interaction with the thread turns 39 formed as a round thread on the connecting piece 31 of the end cap 21. As FIGS. 2 and 3 show, the fluid passage 43 of the bottom part 5 on the outer lower end is extended by a pipe socket 45 on which the port connection (not shown) for draining the cleaned fluid is formed. On the inner end facing away from the lower pipe socket 45, the fluid passage 43 forms an axially projecting annular edge 47 with an end forming a flat annular surface extending in a radial plane and used as a contact surface 49 for the flat lower end surface 35 of a filter element 13 accommodated in the element receiving device which has been formed. In the end section of the opening edge of the fluid passage 43 extending toward the contact surface 49, a sloped surface 51 increases the diameter of the fluid passage 43 toward the contact surface 49. The sloped surface, in interaction with the gasket 38, forms the bottom-side sealing surface of the seal between the end cap 21 and the bottom part 5.

As FIG. 3 shows best, with the screw union tightened the end surface 35 of the end cap 21 adjoins the contact surface 49, and the gasket 38 is pressed between the seat 37 and the sloped surface 51 by the retaining force of the screw union both in the radial direction and in the axial direction. When the filter element 13 is positioned and fixed on the element receiving device formed by the bottom part 5, sealing takes place between the spaces 11 (dirty side in the filtration process) and 17 (clean side). The positive contact of the end surface 35 of the filter element 13 with the contact surface 49 of the annular edge 47 of the bottom part 5 forms a stop device limiting the retaining force when the screw union is tightened, regardless of the tightening moment of the screw union, to a value for which the gasket 38 is pressed on the sloped surface 51 and in the seat 37 such that the sealing force has the strength which is optimum for the material of the gasket 38.

The bottom part 5 does not form a solid body in the upper or inner longitudinal section between the annular edge 47 and the peripheral region 53. That section has a sequence of radially extending ribs 55 arranged in a star shape. With little material consumption, a high structure strength of the bottom part 5, in particular good compressive strength, is achieved. The tops 57 of the ribs 55 extend descending from the annular edge 47 toward the peripheral region 53. This structure increases the distance to the end surface 35 of the adjoining end cap 21 radially to the outside. Without close tolerances having to be adhered to in the molding of the bottom part 5 with respect to the ribs 55, the fixing in position of the end cap 21 is ensured to take place only on the contact surface 49 of the annular edge 47.

Instead of the illustrated screwing elements 33, 41 forming a rounded thread, other screwing elements, for example, a conventional metric thread can be used. Instead of the illustrated combination between the bottom part and the wall of the filter housing 1 extending upward, by forming a flange region 7 the bottom part could be a screwed housing cover or could be configured in one piece with the adjoining housing wall.

The invention claimed is:

1. A filter device comprising:
a cup-shaped filter housing having a longitudinal axis and a housing bottom terminating part bordering an end side of said filter housing, said terminating part having a fluid passage concentric to said longitudinal axis;
a filter element received in said filter housing and said terminating part having an end cap with a connecting piece received in said terminating part and with a flat lower end surface extending in a radial plane relative to said longitudinal axis;
a retaining device detachably coupling said filter element and said filter housing along said longitudinal axis, said retaining device having inner screw elements in said fluid passage and external screw elements on said connecting piece of said end cap interacting with one another;
a sealing device forming a seal between said filter element and said terminating part, said sealing device including a sealing gasket combined with said end cap to form a cohesive component and received in a seat at a transition between said flat lower end surface of said end cap and a first thread turn of said external screw elements; and
an annular edge of said terminating part projecting into an interior of said filter housing and having a contact surface adjoining said end cap by a retaining force of said screw elements; and
radial ribs on said terminating part bordering said flat lower end surface of said end cap and having axial heights decreasing toward a peripheral zone of said terminating part.

2. A filter device, comprising:
a cup-shaped filter housing having a longitudinal axis and a housing bottom terminating part bordering an end side of said filter housing, said terminating part having a fluid passage concentric to said longitudinal axis;
a filter element received in said filter housing and said terminating part having an end cap with a connecting piece received in said terminating part and with a flat lower end surface extending in a radial plane relative to said longitudinal axis;
a retaining device detachably coupling said filter element and said filter housing along said longitudinal axis, said retaining device having inner screw elements in said fluid passage and external screw elements on said connecting piece of said end cap interacting with one another;
a sealing device forming a seal between said filter element and said terminating part, said sealing device including a sealing gasket combined with said end cap to form a cohesive component and received in a seat at a transition between said flat lower end surface of said end cap and a first thread turn of said external screw elements;
an annular edge of said terminating part projecting into an interior of said filter housing and having a contact surface adjoining said end cap by a retaining force of said screw elements; and
radial ribs on said terminating part bordering said flat lower end surface and said annular edge and having axial heights decreasing toward a peripheral zone of said terminating part.

3. A filter device according to claim 2 wherein
said terminating part comprises an oblique surface in said fluid passage on an end section thereof bordering said annular edge, said oblique surface increasing inside diameters of said fluid passage toward said annular edge and forming a sealing surface interacting with said sealing gasket.

4. A filter device according to claim 2 wherein
said external screw elements are thread turns formed as a round thread.

* * * * *